United States Patent
Haldar

(10) Patent No.: US 9,066,314 B2
(45) Date of Patent: Jun. 23, 2015

(54) NOTIFYING A WIRELESS COMMUNICATION SYSTEM ABOUT PREVIOUSLY REGISTERED WIRELESS COMMUNICATION SYSTEMS

(71) Applicant: Sprint Communications Company L.P., Overland Park, KS (US)

(72) Inventor: Debashis Haldar, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 14/026,102

(22) Filed: Sep. 13, 2013

(65) Prior Publication Data

US 2014/0018074 A1   Jan. 16, 2014

Related U.S. Application Data

(63) Continuation of application No. 12/719,937, filed on Mar. 9, 2010, now Pat. No. 8,571,520.

(51) Int. Cl.
| | |
|---|---|
| *H04W 8/00* | (2009.01) |
| *H04W 8/08* | (2009.01) |
| *H04W 60/00* | (2009.01) |
| *H04M 1/66* | (2006.01) |
| *H04M 1/68* | (2006.01) |
| *H04M 3/16* | (2006.01) |
| *H04W 8/14* | (2009.01) |
| *H04W 88/06* | (2009.01) |

(52) U.S. Cl.
CPC ............... *H04W 60/00* (2013.01); *H04M 1/66* (2013.01); *H04M 1/68* (2013.01); *H04M 3/16* (2013.01); *H04W 8/14* (2013.01); *H04W 88/06* (2013.01)

(58) Field of Classification Search
CPC .................................. H04W 4/00; H04W 8/08
USPC ............. 455/458, 435.1, 435.2; 370/328–335
See application file for complete search history.

(56) References Cited

U.S. PATENT DOCUMENTS

| | | | |
|---|---|---|---|
| 5,513,242 | A | 4/1996 | Mukerjee et al. |
| 5,521,984 | A | 5/1996 | Denenberg et al. |
| 5,940,756 | A * | 8/1999 | Sibecas et al. ............. 455/426.1 |
| 6,587,684 | B1 | 7/2003 | Hsu et al. |
| 7,443,983 | B2 | 10/2008 | Tanizawa et al. |
| 2005/0078636 | A1* | 4/2005 | Zhang et al. .................. 370/331 |
| 2005/0259620 | A1* | 11/2005 | Igarashi et al. ............... 370/331 |

(Continued)

*Primary Examiner* — Kent Chang
*Assistant Examiner* — William Lu

(57) ABSTRACT

Embodiments disclosed herein provide systems and methods that notify a current wireless communication network about a previous wireless communication network. In a particular embodiment, a wireless device wirelessly registers with a first wireless communication system to obtain first registration data. The wireless device stores the first registration data and wirelessly communicates over the first wireless communication system. The communications are then terminated with the first wireless communication system. After terminating the wireless communications with the first wireless communication system, the wireless device wirelessly registers with a second wireless communication system to obtain second registration data and stores the second registration data. The wireless device transfers the first registration data to the second wireless communication system and receives user information from the second wireless communication system. The second wireless communication system used the first registration data to retrieve the user information from the first wireless communication system.

18 Claims, 6 Drawing Sheets

(56) References Cited

U.S. PATENT DOCUMENTS

| | | | |
|---|---|---|---|
| 2006/0099950 A1 | 5/2006 | Klein et al. | |
| 2006/0135160 A1* | 6/2006 | Jiang | 455/435.1 |
| 2006/0161626 A1* | 7/2006 | Cardina et al. | 709/206 |
| 2006/0211423 A1 | 9/2006 | Ejzak et al. | |
| 2007/0058585 A1 | 3/2007 | Mudigonda et al. | |
| 2007/0066280 A1 | 3/2007 | Arai | |
| 2007/0100981 A1 | 5/2007 | Adamczyk et al. | |
| 2007/0101408 A1 | 5/2007 | Nakhjiri | |
| 2008/0070555 A1 | 3/2008 | Sharma | |
| 2008/0305811 A1 | 12/2008 | Cai et al. | |
| 2008/0310371 A1 | 12/2008 | Russell | |
| 2009/0141683 A1 | 6/2009 | Grinshpun et al. | |
| 2009/0175239 A1 | 7/2009 | Grinshpun et al. | |
| 2009/0176513 A1* | 7/2009 | Bosch et al. | 455/458 |
| 2009/0207810 A1* | 8/2009 | Petrovic et al. | 370/331 |
| 2009/0257400 A1 | 10/2009 | Perras | |
| 2009/0257402 A1 | 10/2009 | Zhu et al. | |
| 2009/0270098 A1 | 10/2009 | Gallagher et al. | |
| 2009/0285186 A1* | 11/2009 | Chin et al. | 370/335 |
| 2010/0061308 A1* | 3/2010 | Becker et al. | 370/328 |
| 2010/0087193 A1 | 4/2010 | Bishop et al. | |
| 2010/0120427 A1 | 5/2010 | Guo | |
| 2010/0120428 A1* | 5/2010 | Kuhn | 455/435.1 |
| 2010/0189099 A1 | 7/2010 | Bae et al. | |
| 2010/0210264 A1 | 8/2010 | Netanel et al. | |
| 2011/0249636 A1* | 10/2011 | Cherian et al. | 370/329 |

* cited by examiner

NOTIFYING A WIRELESS COMMUNICATION SYSTEM ABOUT PREVIOUSLY REGISTERED WIRELESS COMMUNICATION SYSTEMS

RELATED CASES

This application is a continuation of U.S. patent application Ser. No. 12/719,937 that was filed on Mar. 9, 2010 and that is entitled "NOTIFYING A WIRELESS COMMUNICATION SYSTEM ABOUT PREVIOUSLY REGISTERED WIRELESS COMMUNICATION SYSTEMS." U.S. patent application Ser. No. 12/719,937 is hereby incorporated by reference into this patent application.

TECHNICAL BACKGROUND

Wireless devices, such as cellular phones, communicate and exchange user information with other devices and systems using wireless communication networks. A wireless device may be capable of communicating with multiple wireless networks that operate using one or more wireless protocols. The wireless device will register with one of the wireless networks in order to exchange communications with that network. If the wireless device is to communicate over another wireless network, then the wireless device must register with that other network. The registration process identifies the wireless device to the wireless network so that user information destined for the wireless device arrives appropriately at the wireless device.

Under some circumstances the connection between the wireless device and the wireless network may be terminated before all user information has been received in the wireless device. This may be the case if the wireless device powers off, leaves the coverage area, or otherwise terminates service with the wireless network. If the wireless device then regains service in an area serviced by another wireless network, then the wireless device may never receive the undelivered user information that is still in the previous wireless network.

OVERVIEW

Embodiments disclosed herein provide systems and methods that notify a current wireless communication network about a previous wireless communication network. In a particular embodiment, a wireless device wirelessly registers with a first wireless communication system to obtain first registration data. The wireless device stores the first registration data and wirelessly communicates over the first wireless communication system. The communications are then terminated with the first wireless communication system. After terminating the wireless communications with the first wireless communication system, the wireless device wirelessly registers with a second wireless communication system to obtain second registration data and stores the second registration data. The wireless device transfers the first registration data to the second wireless communication system and receives user information from the second wireless communication system. The second wireless communication system used the first registration data to retrieve the user information from the first wireless communication system.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
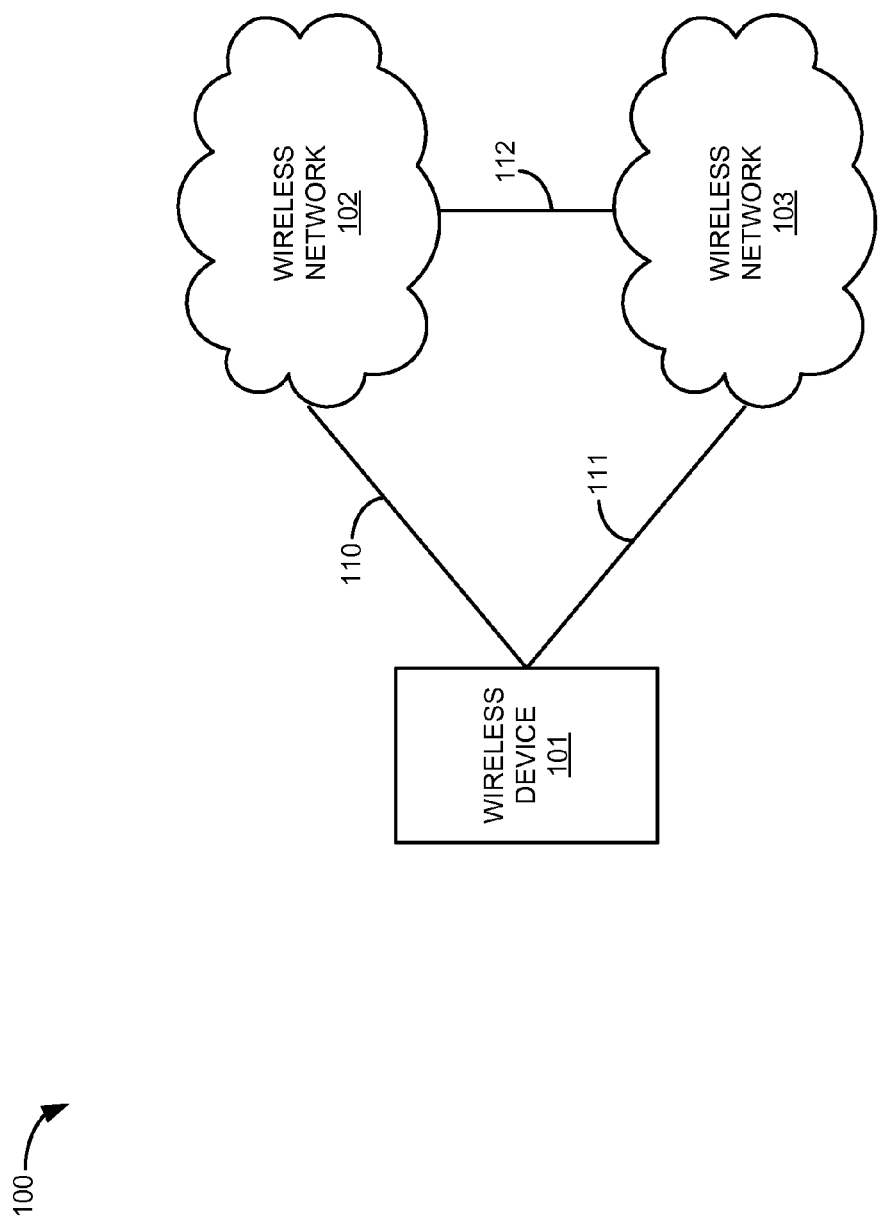
FIG. 1 illustrates a wireless communication system.

FIG. 1 illustrates wireless communication system 100. Wireless communication system 100 includes wireless communication device 101, wireless communication network 102, and wireless communication network 103. Wireless device 101 and wireless network 102 communicate over wireless link 110. Wireless device 101 and wireless network 103 communicate over wireless link 111. Wireless network 102 and wireless network 103 communicate over link 112.

In operation, wireless device 101 is capable of connecting to, and communicating with, multiple wireless networks. Specifically, wireless device 101 is capable of connecting to wireless networks 102 and 103. Wireless networks 102 and 103 may be two different generations of networks, such as Evolution-Data Optimized (EV-DO) and Worldwide Interoperability for Microwave Access (WiMAX). Although, wireless networks 102 and 103 can each be any type of wireless network, including the same type of wireless network. Wireless networks 102 and 103 may be operated by the same network-operating carrier, thereby allowing wireless device 101 to communicate with both wireless networks 102 and 103.

In some situations, wireless device 101 may lose wireless connectivity with one of the wireless networks, such as wireless network 102, while user information destined for wireless device 101 has yet to be delivered. The user information could be any type of data such as a text message, email, voice mail, application data, or any other user data directed to wireless device 101. The undelivered user information may be lost if wireless device 101 does not reconnect to wireless network 102.

Figure 2:
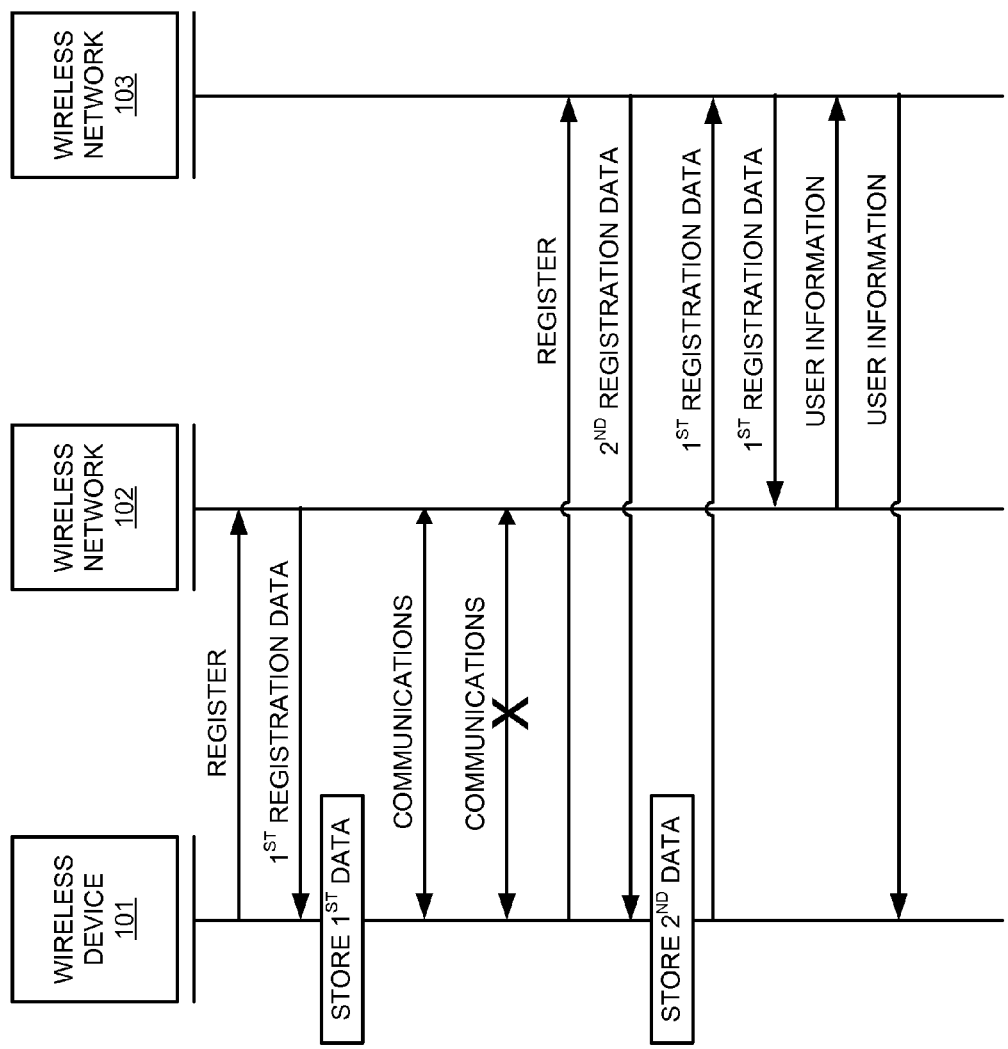
FIG. 2 illustrates the operation of a wireless communication system.

FIG. 2 is a sequence diagram illustrating the operation of wireless communication system 100. The sequence begins with wireless device 101 registering with wireless network 102. An authorization system within wireless network 102 may register wireless device 101 with wireless network 102 by determining whether wireless device 101 is allowed to access wireless network 102. For example, the authorization system may determine whether wireless device 101 belongs to an account authorized to access wireless network 102, whether that account is up to date, what services are allowed to be accessed by wireless device 101, or any other factor that may contribute to whether wireless device 101 is allowed to access wireless network 102.

As a result of registration, wireless device 101 obtains first registration data. Some or all of the first registration data may be obtained from wireless network 102 or may be derived from information already stored on wireless device 101. The first registration data may contain information that identifies wireless network 102 and information that identifies wireless device 101 to wireless network 102, such as a phone number or user identification. Once registered, wireless device 101 communicates over wireless network 102. Communicating over wireless network 102 may include exchanging user information or control communications between wireless device 101 and wireless network 102. User information may be one or more text messages, emails, application data, or any other type of information that wireless network 102 could not deliver to wireless device 101 due to the terminated connection.

The communications between wireless device 101 and wireless network 102 are terminated. The communications may be terminated from a powering off of wireless device 101, wireless device 101 losing wireless connectivity with wireless network 102, wireless device 101 determining that a better wireless connection is available on wireless network 103, an error within a system of wireless network 102 or any other reason that would cause wireless device 101 to no longer communicate over wireless network 102. The communications between wireless device 101 and wireless network 102 were terminated while user information destined for wireless device 101 had yet to be delivered by wireless network 102.

When wireless device 101 is capable of wirelessly communicating with wireless network 103, such as when wireless device 101 powers on within the wireless coverage area of wireless network 103, wireless device 101 registers with wireless network 103. Wireless device 101 obtains second registration data as a result of the registration. Some of all of the second registration data, like the first registration data, may be obtained from wireless network 103 or derived from information already stored on wireless device 101. The second registration data may include information that identifies wireless network 103 and information that identifies wireless device 101 to wireless network 103. The registration data is stored in wireless device 101. The registration with wireless network 103 may occur before the termination of communications with wireless network 102. An example of which may be if wireless device 101 is handing off from wireless network 102 to wireless network 103.

Wireless device 101 transfers the first registration data, which wireless device 101 received when registering with wireless network 102, to wireless network 103. The first registration data may be transferred along with the registration request to wireless network 103 but may be also be transferred separately. Wireless network 103 uses the first registration data to retrieve the user information from wireless network 102. Wireless network 103 then transfers, or forwards, the user information to wireless device 101. Therefore, the undelivered user information can still reach wireless device 101 when wireless device 101 connects to wireless network 103 instead of reconnecting to wireless network 102.

In some embodiments, the sequence may continue if user information is undelivered when wireless connectivity between wireless device 101 and wireless network 103 is terminated. In that case, wireless device 101 may transfer the second registration data to the next wireless network that wireless device 101 registers. The next network may be wireless network 102, but may be some other wireless network. That next network can then retrieve the undelivered user information for wireless device 101 from wireless network 103 using the same method stated before. Hence, wireless device 101 stores at least the most recent registration data obtained by wireless device 101 in order to notify a subsequent network of a previously registered network, thereby allowing the subsequent network to query the previous network for undelivered user information.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless networks 102 and 103 are communication networks that comprise telephony switches, wireless access nodes, Internet routers, network gateways, computer systems, communication links, or some other type of communication equipment—including combinations thereof.

Wireless links 110-111 use the air or space as the transport media. Wireless links 110-111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
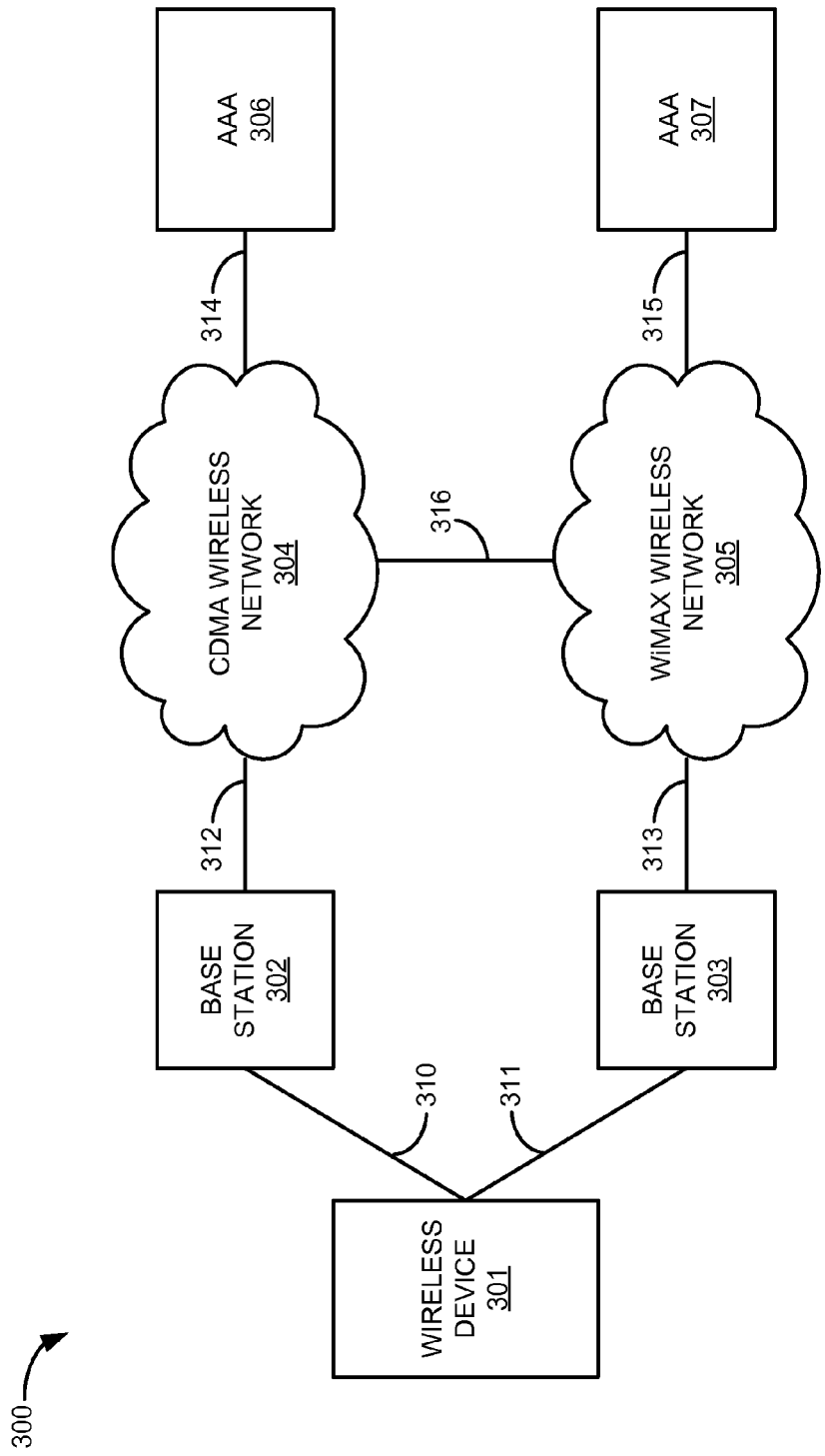
FIG. 3 illustrates a wireless communication system.

FIG. 3 illustrates wireless communication system 300. Wireless communication system 300 includes wireless device 301, base station 302, base station 303, CDMA wireless network 304, WiMAX wireless network 305, authentication, authorization, and access (AAA) system 306, and AAA system 307. Wireless device 301 and base station 302 communicate over wireless link 310. Wireless device 301 and base station 303 communicate over wireless link 311. Base station 302 and CDMA wireless network 304 communicate over link 312. Base station 303 and WiMAX wireless network 305 communicate over link 313. CDMA wireless network 304 and AAA system 306 communicate over link 314. WiMAX wireless network 305 and AAA system 307 communicate over link 315. CDMA wireless network 304 and WiMAX wireless network 305 communicate over link 316.

Figure 4:
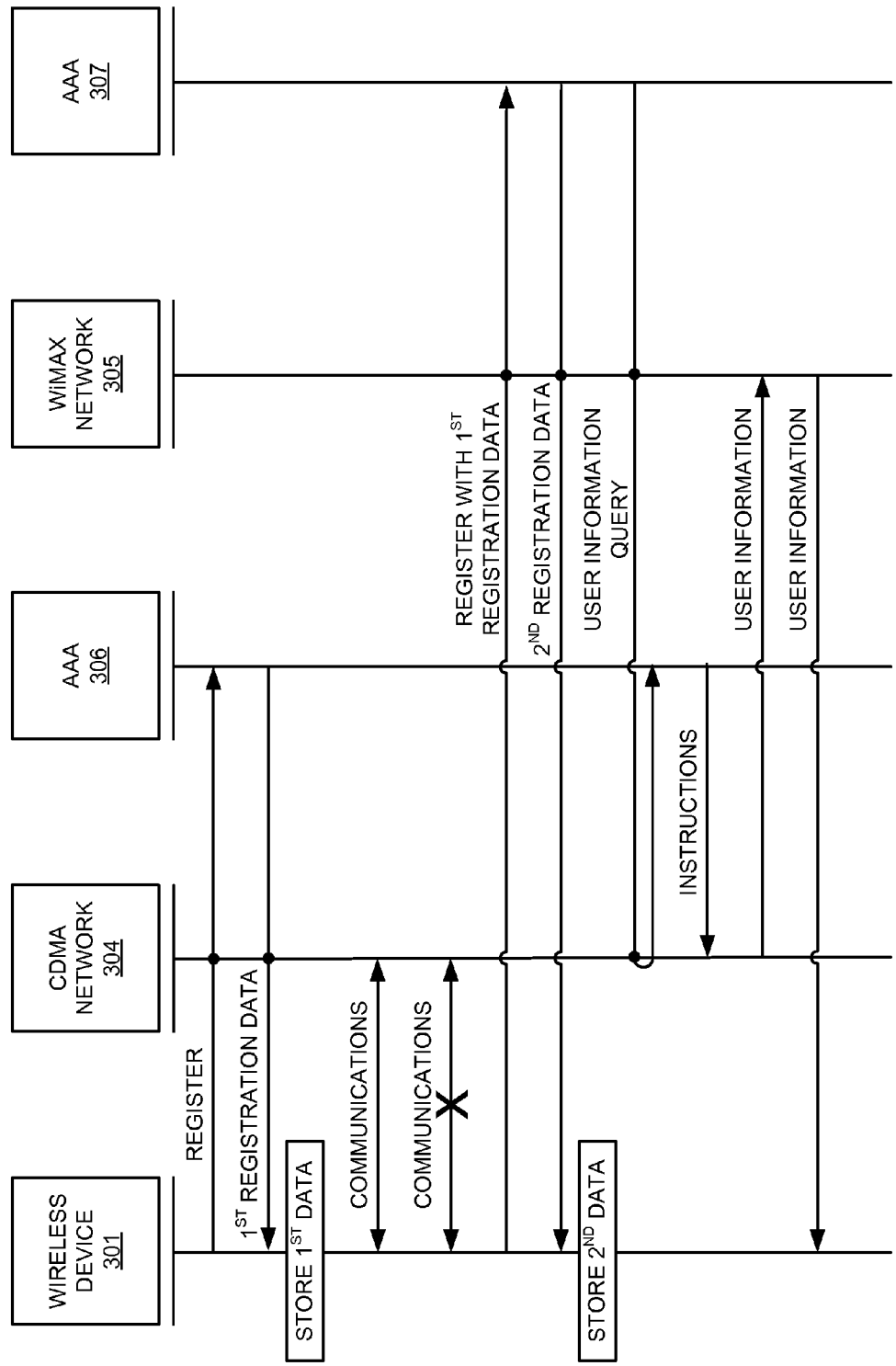
FIG. 4 illustrates the operation of a wireless communication system.

FIG. 4 is a sequence diagram illustrating the operation of wireless communication system 300. The sequence begins with wireless device 301 registering with AAA 306 of CDMA wireless network 304 via base station 302. During the registration, wireless device 301 obtains and stores first registration data for the registration from AAA 306. The registration data may include information that identifies CDMA wireless network 302 and information that identifies wireless device 301 to CDMA wireless network 302. Registering with CDMA wireless network 304 allows mobile device 301 to exchange communications with CDMA wireless network 304. At a point in time after registering with CDMA wireless network 304, the communications between wireless device 301 and CDMA wireless network 304 are terminated. The communications may be terminated because wireless device 301 loses wireless connectivity with base station 302, is powered down, or some other reason that wireless device 301 may lose connectivity with CDMA wireless network 304.

After losing the connection with CDMA wireless network 304 and experiencing an appreciable period of time with no wireless connectivity to either CDMA wireless network 304 or WiMAX wireless network 305, wireless device 301 becomes capable of wirelessly communicating with WiMAX wireless network 305 via base station 303. Wireless device 301 registers with AAA 307 of WiMAX wireless network 305 and obtains second registration data. During the registration process, wireless device 301 transfers the first registration data to AAA 307. Wireless device 301 stores the second registration data.

AAA 307 processes the first registration data to determine that wireless device 301 previously registered on CDMA wireless network 304 and what identifier AAA 307 should use to identify wireless device 301 to CDMA wireless network 304. AAA 307 then queries AAA 306 for any undelivered user information on CDMA wireless network 304 destined for wireless device 301. The identifier for wireless device 301 from the first registration data allows AAA 306 to perform the necessary functions to determine whether CDMA wireless network 304 contains any undelivered user information for wireless device 301. AAA 306 may query other systems in CDMA wireless network 304 in order to determine whether any undelivered information exists. If AAA 306 determines that there is undelivered user information, then AAA 306 instructs CDMA wireless network 304 to transfer the user information to WiMAX wireless network 305. WiMAX wireless network 305 then transfers the user information to wireless device 301. Therefore, wireless device 301 receives all user information destined for wireless device 301 even though wireless device 301 switched networks before all user information could arrive.

Figure 5:
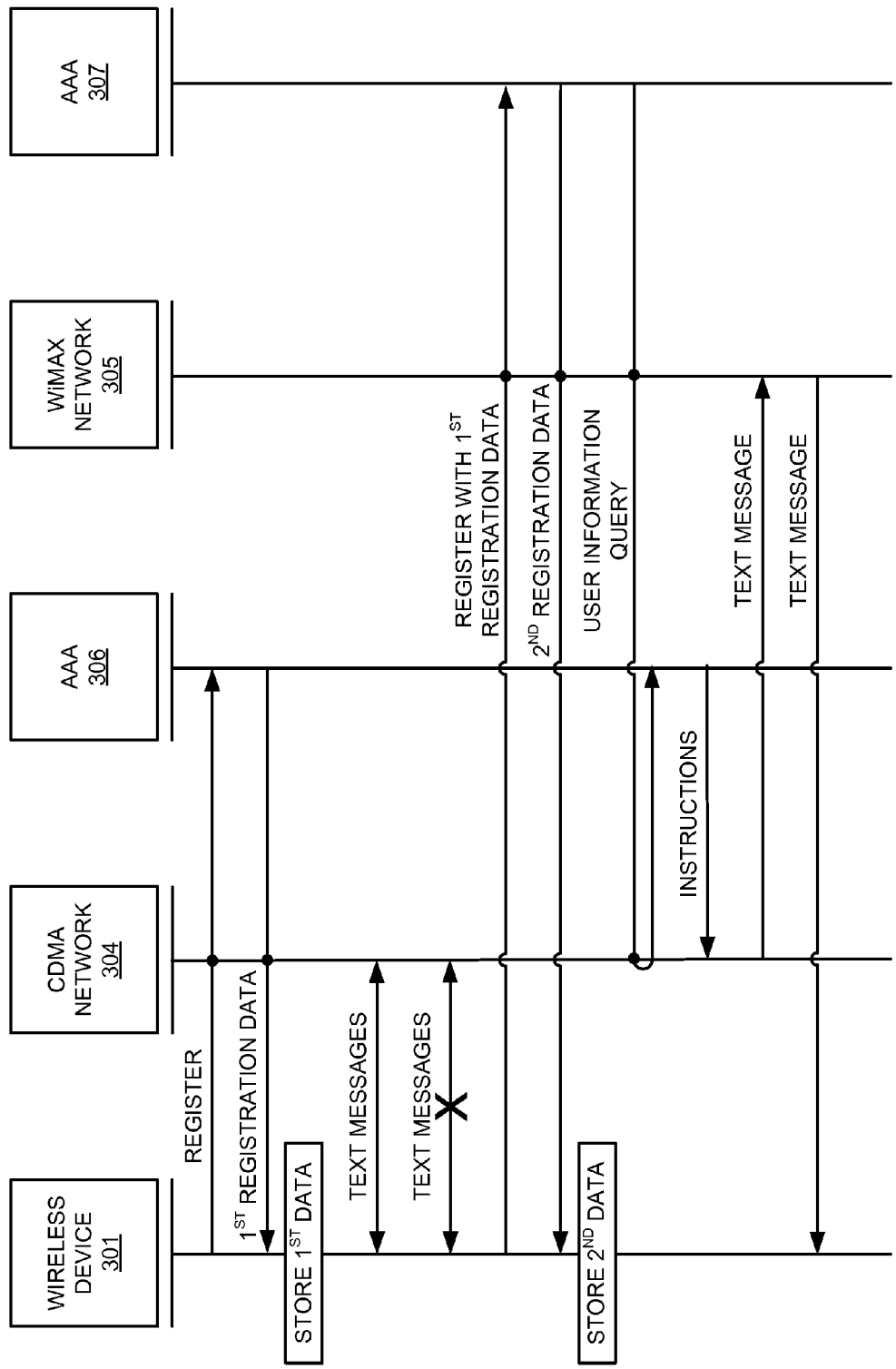
FIG. 5 illustrates the operation of a wireless communication system.

FIG. 5 is a sequence diagram illustrating the operation of wireless communication system 300 in an example embodiment. In this example, wireless device 301 registers with AAA 306 for CDMA wireless network 304. Wireless device 301 obtains and stores first registration data from the registration process. Once registered with CDMA wireless network 304, wireless device 301 exchanges text messages between the user of wireless device 301 and the user of another wireless device located on CDMA wireless network 304, WiMAX wireless network 305, or some other wireless network not shown in FIG. 3. In the middle of the text message exchange, wireless device 301 loses wireless connectivity with CDMA wireless network 304 by moving out of the coverage area of base station 302. When the connection was lost a text message sent to wireless device 301 gets stuck in CDMA wireless network 304 because wireless device 301 is no longer available for delivery of the text message.

After losing connectivity with CDMA wireless network 304 and experiencing a period of time with no wireless connectivity, wireless device 301 moves into the coverage area of base station 303 of WiMAX wireless network 305. Thus, wireless device 301 registers with AAA 307 for WiMAX wireless network 305 and transfers the first registration data along with the registration request. Wireless device 301 obtains and stores second registration data. Wireless device 301 is now capable of exchanging communications with WiMAX wireless network 305.

AAA 307 processes the first registration data to determine that wireless device 301 had most recently registered with CDMA wireless network 304 before registering with WiMAX wireless network 305. AAA 307 also determines the identifier used by CDMA wireless network 304 for wireless device 301. AAA 307 then submits a query to AAA 306 to determine whether any user information is left undelivered on CDMA wireless network 304 from the previously registered communication session of wireless device 301. In this example, AAA 306 determines, either by itself or with the help of other systems, that a text message from the previous session is still undelivered to wireless device 301. AAA 306 instructs CDMA wireless network 304 to transfer the text message to WiMAX wireless network 305. WiMAX wireless network 305 then forwards the text message to wireless device 301. Therefore, wireless device 301 is able to receive the text message despite having lost the connection with CDMA wireless network 304 and registering with a different wireless network.

Figure 6:
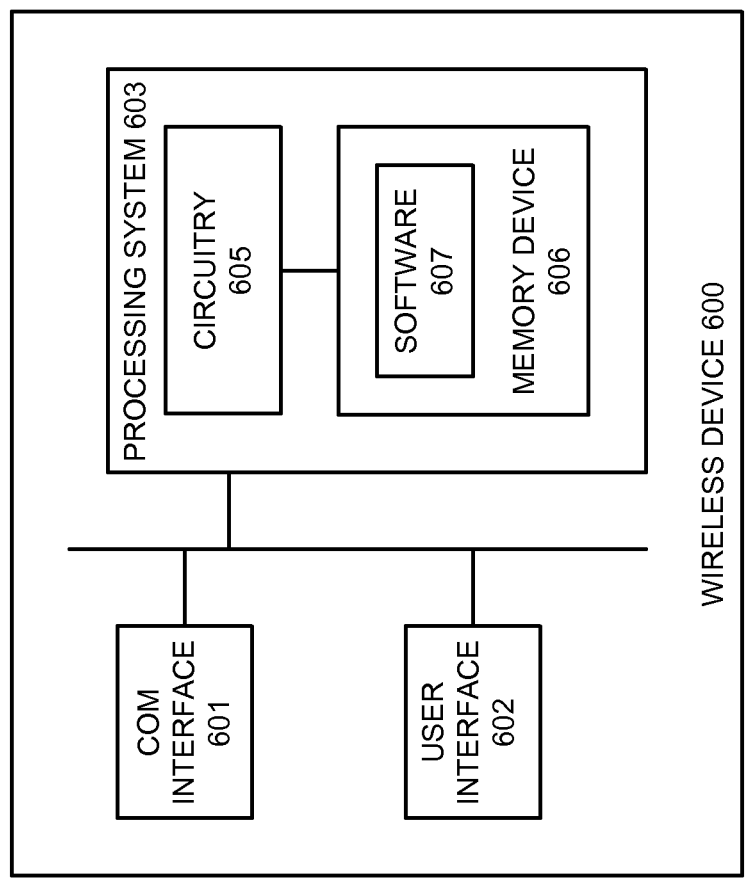
FIG. 6 illustrates a wireless communication device.

FIG. 6 illustrates wireless communication device 600. Wireless communication device 600 is an example of wireless communication device 101, although device 101 could use alternative configurations. Wireless communication device 600 comprises wireless communication interface 601, user interface 602, and processing system 603. Processing system 603 is linked to wireless communication interface 601 and user interface 602. Processing system 603 includes processing circuitry 605 and memory device 606 that stores operating software 607. Wireless communication device 601 may include other well-known components such as a battery and enclosure that are not shown for clarity. Wireless communication device 601 may be a telephone, computer, e-book, mobile Internet appliance, media player, game console, wireless network interface card, or some other wireless communication apparatus—including combinations thereof.

Wireless communication interface 601 comprises RF communication circuitry and an antenna. The RF communication circuitry typically includes an amplifier, filter, RF modulator, and signal processing circuitry. Wireless communication interface 601 may also include a memory device, software, processing circuitry, or some other communication device. Wireless communication interface 601 may use various protocols, such as CDMA, EVDO, WIMAX, GSM, LTE, WIFI, HSPA, or some other wireless communication format.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may omitted in some examples.

Processing circuitry 605 comprises microprocessor and other circuitry that retrieves and executes operating software 607 from memory device 606. Memory device 606 comprises a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 may include an operating system, utilities, drivers, network interfaces, applications, or some other type of software. When executed by processing circuitry 605, operating software 607 directs processing system 603 to operate wireless communication device 600 as described herein.

In particular, under the direction of processing system 603, communication interface 601 wirelessly registers with a first wireless communication system to obtain first registration data. Processing system 603 stores the first registration data in memory device 606. Communication interface 601 then wirelessly communicates over the first wireless communication system and terminates the wireless communications with the first wireless communication system. After the wireless communications with the first wireless communication system are terminated, communication interface 601 wirelessly registers with a second wireless communication system to obtain second registration data. Processing system stores the second registration data in memory device 606. Communication interface 601 then wirelessly transfers the first registration data to the second wireless communication system. Communication interface 601 receives user information from the second wireless communication system, wherein the second wireless communication system used the first registration data to retrieve the user information from the first wireless communication system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device comprising: a wireless communication interface configured to individually communicate with a plurality of different wireless networks; a data processing system configured to direct the wireless communication interface to register the wireless communication device with individual ones of the wireless networks; the data processing system further configured to store registration data from the wireless registrations that identifies the wireless networks and that identifies the wireless communication device within the wireless networks; the data processing system further configured to direct the wireless communication interface to transfer the stored registration data that identifies the wireless networks and the wireless communication device when registering with at least one of the wireless networks; and wherein the wireless communication interface is configured to receive undelivered user information transferred between the wireless networks in response to the transfer of the stored registration data.

2. The wireless communication device of claim 1 wherein user information comprises a text message.

3. The wireless communication device of claim 1 wherein the wireless communication interface is configured to use a Long Term Evolution protocol and a High Speed Packet Access protocol.

4. The wireless communication device of claim 1 wherein the wireless communication interface is configured to use a Long Term Evolution protocol and an Evolution Data Optimized protocol.

5. The wireless communication device of claim 1 wherein the wireless communication interface is configured to use a Long Term Evolution protocol and a Global System for Mobile communications protocol.

6. The wireless communication device of claim 1 wherein the wireless communication interface is configured to use a Long Term Evolution protocol and a Code Division Multiple Access protocol.

7. The wireless communication device of claim 1 wherein the wireless communication interface is configured to use a Long Term Evolution protocol and a Worldwide Interoperability for Microwave Access protocol.

8. The wireless communication device of claim 1 wherein the wireless communication interface is configured to use a Long Term Evolution protocol and a Wireless Fidelity protocol.

9. The wireless communication device of claim 1 wherein the stored registration data that identifies the wireless communication device comprises a user identifier.

10. A software apparatus for a wireless communication device having a wireless communication interface that individually communicates with a plurality of different wireless networks, the software apparatus comprising: software that when executed directs a processing system to direct the wireless communication interface to register the wireless communication device with individual ones of the wireless networks, store registration data from the wireless registrations that identifies the wireless networks and that identifies the wireless communication device within the wireless networks, and direct the wireless communication interface to transfer the stored registration data that identifies the wireless networks and the wireless communication device when registering with at least one of the wireless networks; a non-transitory computer readable medium that stores the software; and wherein the wireless communication interface receives undelivered user information transferred between the wireless networks in response to the transfer of the stored registration data.

11. The software apparatus of claim 10 wherein user data comprises a text message.

12. The software apparatus of claim 10 wherein the wireless communication interface is configured to use a Long Term Evolution protocol and a High Speed Packet Access protocol.

13. The software apparatus of claim 10 wherein the wireless communication interface is configured to use a Long Term Evolution protocol and an Evolution Data Optimized protocol.

14. The software apparatus of claim 10 wherein the wireless communication interface is configured to use a Long Term Evolution protocol and a Global System for Mobile communications protocol.

15. The software apparatus of claim 10 wherein the wireless communication interface is configured to use a Long Term Evolution protocol and a Code Division Multiple Access protocol.

16. The software apparatus of claim 10 wherein the wireless communication interface is configured to use a Long Term Evolution protocol and a Worldwide Interoperability for Microwave Access protocol.

17. The software apparatus of claim 10 wherein the wireless communication interface is configured to use a Long Term Evolution protocol and a Wireless Fidelity protocol.

18. The software apparatus of claim 10 wherein the stored registration data that identifies the wireless communication device comprises a user identifier.

* * * * *